INVENTOR.
DI CHEN
BY Robert O. Vidas
ATTORNEY

United States Patent Office 3,560,871
Patented Feb. 2, 1971

3,560,871
FIELD RESPONSIVE ABSORBER FOR Q-SPOILING A LASER
Di Chen, Hopkins, Minn., assignor to Honeywell, Inc., a corporation of Delaware
Filed Feb. 27, 1964, Ser. No. 347,934
Int. Cl. H01s 3/10
U.S. Cl. 331—94.5        6 Claims

ABSTRACT OF THE DISCLOSURE

Apparatus for Q-spoiling a maser utilizing either the Zeeman or Stark effect. Included within an optical cavity defined by two reflective surfaces are a maser region, an absorber region and a reflection eliminating spacer between the maser and absorber regions. A high population inversion is achieved by applying a varying field to the absorber region, whereby the absorption spectrum of the absorber region is super-imposed on the emission spectrum of the maser region. After a high population inversion is achieved, the absorption spectrum of the absorber region is shifted by either the Zeeman or Stark effect. The absorber region is then transparent to the maser region's emission frequency, whereby the optical cavity defined by the two reflective surfaces resonates producing a large output pulse.

---

The present invention is directed to apparatus for producing high peak power pulses of monochromatic coherent electromagnetic energy and more particularly to Q-spoiling of masers and lasers. Where the term coherent is used, it is intended to mean energy which is essentially emitted in a single phase. Where the term monochromatic is used, it is intended to include light of certain wave lengths within a very few angstrom units. The term maser is intended to include devices operating within the microwave, infrared, visible, and ultraviolet regions and specifically includes lasers or optical masers.

Q-spoiling of masers is a technique utilized to obtain a narrow pulse width, high peak energy output from a pulsed maser. The term is applied because the maser action of the device is forestalled while the maser is being pumped, until a certain suitable time. Maser action then takes place and a giant pulse having a peak power many times that of the ordinary pulsed maser is emitted. Various schemes have been suggested for Q-spoiling masers. Essentially, these techniques involve placing a shutter of some sort within the cavity to prevent maser action from building up by reflections from the end mirrors during the normal pumping. The maser may then be pumped to an extremely high population inversion without emission. When the shutter is opened, a giant pulse is emitted in place of the series of smaller pulses or continuous wave that would have been emitted had the shutter not been present. Prior art Q-spoilers have had two serious drawbacks. They have been difficult to build and have required high power to cause Q-switching. The present invention overcomes these two drawbacks. It is extremely simple to construct and operates with applied voltages of the order of 100 volts, whereas Kerr cell and similar Q-spoilers require voltages of the order of 10,000 volts.

The present invention makes use of either of two effects; the Stark effect or the Zeeman effect, to provide apparatus for Q-switching within the maser cavity. The Zeeman effect, as related to the present invention, is a shift in the absorption spectrum of a material as a result of the application of a magnetic field. The Stark effect is a shift in the absorption spectrum of a material as a result of the application of an electric field. The amount of light absorbed by a material at a particular wave length within its absorption spectrum can be changed by the application of a magnetic field or of an electric field if this material exhibits Zeeman or Stark effects respectively. For the purpose of this specification, field means either a magnetic or an electric field. In accordance with the present invention, an absorber region exhibiting one of the above effects is positioned within a maser cavity and a varying field applied to the absorber so that it varies in transparency to the emission frequency of the maser.

The present invention can best be understood from the study of the following specification and drawings where in:

Figure 2:
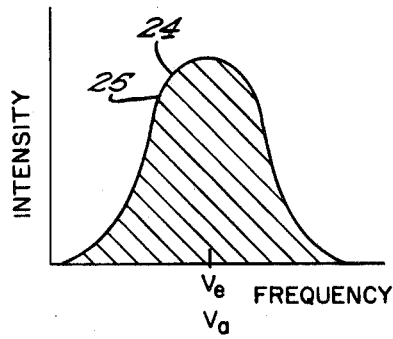
FIG. 2 is a composite plot of the fluorescent line of an optical maser material having a Gaussian distribution and the absorption line of a similar material when the absorber is strongly absorbing to the source.
Figure 3:
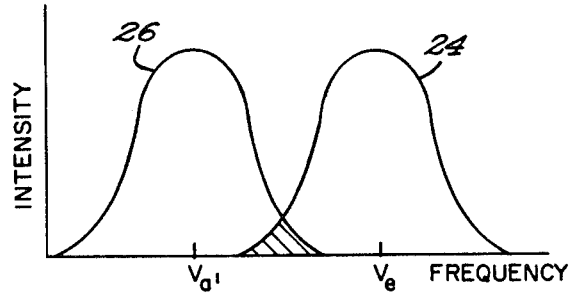
Figure 4:
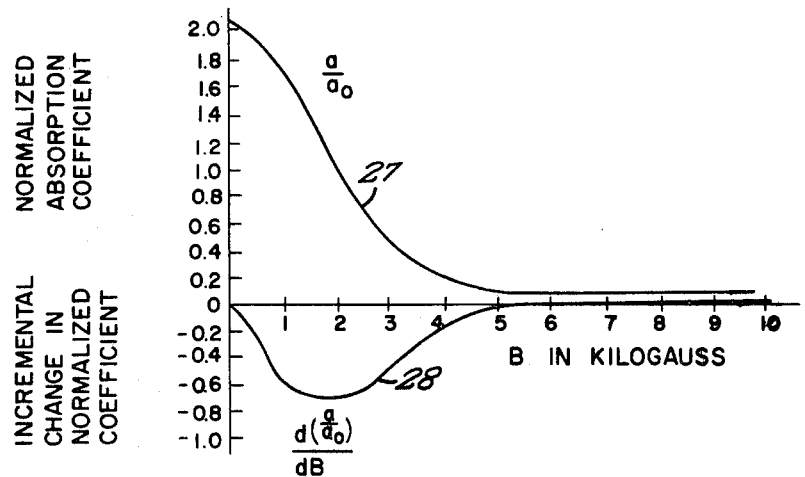

FIG. 3 is a composite plot of the fluorescent line of FIG. 2 and the absorption line of the absorber when the absorber appears transparent to the source due to a shift in the absorption line; and FIG. 4 is a composite plot of the normalized absorption coefficient of a material as a function of magnetic field strength and a plot of the first derivative of the normalized absorption coefficient with respect to the field strength at a particular frequency laser emission for one form of the invention. Both plots are for a ruby absorber.

Figure 1:
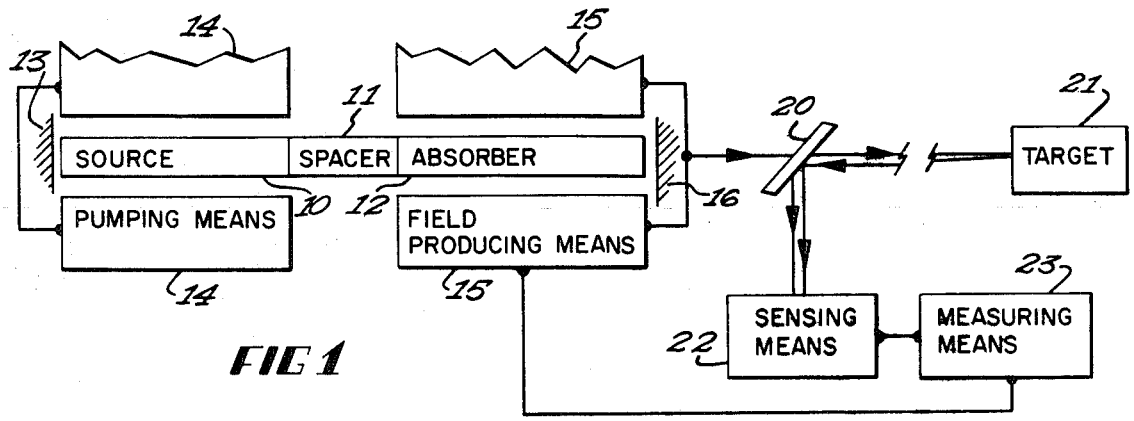
FIG. 1 is a schematic illustration of one form of the invention using either the Zeeman effect or Stark effect.

Referring now to the drawings, in FIG. 1 there is shown a schematic illustration of the present invention. A monochromatic electro-magnetic energy source 10 which may be for example, a laser region or a maser region is separated from absorber region 12 by spacer region 11. In a preferred form of the present invention, source 10 is a ruby laser. Spacer 11 is not necessary to the operation of the present invention but is included merely to eliminate reflections from internal maser and absorber to air or other surrounding medium interfaces. Reflective surfaces 13 and 16 define the ends of the resonant cavity for source 10. Of the two reflective surfaces, one may be totally reflective and the other partially reflective, or both may be partially reflective. The configuration and composition of such reflective surfaces are well known in the art. A partially reflective surface, here shown as surface 16, may be at either end of the resonant cavity. A pumping means 14 which may be, for example, be an optical pump, provides energy for pumping source 10 to a population inversion that would normally produce laser action and emission. However, a varying field producing means 15 simultaneously produces a proper field, which may be zero field, in absorber 12 to superimpose the absorption spectrum of absorber 12 shown by plot 25 in FIG. 2 upon the emission spectrum of source 10 as shown by plot 24. With absorber 12 strongly absorbing, fluorescence emission from source 10 therefore sees only reflective surface 13. No resonant cavity is present in which stimulated emission can buildup. After source 10 is pumped to a high population inversion, field producing means 15 varies the strength of the field in absorber 12, thereby shifting the absorption spectrum of absorber 12 by the Zeeman effect or Stark effect. Due to the shift in the absorption spectrum, absorber 12 becomes substantially transparent to the emission frequency of source 10. A resonant cavity defined by reflective surfaces 13 and 16 then allows the buildup of a large pulse of stimulated emission. The result of successive variations in the field in absorber 15 is spaced high peak power pulses, or a Q-spoiled laser output.

A means for splitting a pulse emitted from the partially reflective surface 16, here shown as beam splitter 20, splits the emergent pulse into two beams. A first of the two beams is transmitted to sensing means 22 which may be any light responsive cell having a relatively rapid response time. The second beam from beam splitter 20 proceeds on to target 21 and is reflected back from target 21 to beam splitter 20. Beam splitter 20 then reflects the beam from target 20 to sensing means 22. The output from sensing means 22 is connected to measuring means 23 wherein the difference in time between the signals resulting from the first and second beams is converted to a reading of the distance from sensing means 22 to target 21. Measuring means 23 may also be adapted to determine the speed and direction of target 21 relative to sensing means 22 by comparing successive distance readings and the intervening time elapsed. Measuring means 23 may be connected in cooperative relationship, as shown in FIG. 1, with field producing means 15 to adjust the timing of the pulses emitted at reflective surface 16.

The above description discloses a ranging system embodying the present invention. Those skilled in the art will undoubtedly envision many other systems employing the Q-spoiled maser output of the monochromatic electromagnetic energy source of the present invention. Many modifications of the present invention will be apparent to those skilled in the art. For example, field producing means 15 may be either a magnetic field producing or an electric field producing means depending upon whether the absorber Q-spoiler 12 exhibits a strong Zeeman or Stark shift respectively. If absorber 12 exhibits a strong Zeeman shift, field producing means 15 may include field coils and a biasing magnet to produce a DC bias field upon which the field coils superimpose small changes to control the emission of pulses. The field coils can be adapted to produce either an AC field or an additional DC field to supplement or oppose the bias field. The Q-spoiler absorber 12 could, of course, be a material which is normally relatively transparent to the source wave length and whose absorption spectrum can be shifted so that it becomes essentially less transparent by the application of a magnetic or electrical field. Choice of material for absorber 12 will be dictated by the choice of source 10. Field producing means 15 may also include capacitor plates producing an electric field in response to a variable power source.

FIG. 2 is a graphical representation of a composite of the fluorescence and absorption charateristics respectively of a maser material showing a Gaussian distribution around frequencies $\omega_e$ and $\omega_a$ respectively. These curves are merely illustrative, and it should be apparent that for various types of masers the curves may show marked deviation from the Gaussian distribution of these examples. FIG. 2 is a plot of intensity vs. frequency for an output of an idealized maser material. In FIG. 2, the emission and absorption curves are substantially superimposed, representing a value of field strength, which may be zero field or a particular applied field, wherein the Q-spoiler absorber 12 appears substantially opaque to the emission frequency of source 10 by absorbing the emission in the crosshatched area. As previously indicated, for the condition of FIG. 2, stimulated emission cannot occur because the emitted radiation cannot see both end mirrors of the resonant cavity.

In FIG. 3, there is shown a composite plot of the fluorescent line 24 and the absorption line 26 of an idealized maser material when the applied field has been changed from that applied in FIG. 2 so that the Zeeman or Stark shift has separated the emission and absorption curves. Absorber 12 then absorbs on line 26 whereas source 10 emits on line 24. In this case, absorber 12 appears nearly transparent to source 10 absorbing emitted radiation only in the crosshatched area where the two curves overlap. Emitted radiation at $\omega_e$ may then resonate in the cavity formed between reflective surfaces 13 and 16 to build up a giant pulse of stimulated emission. Thus, there is provided a means for producing time varying high energy pulses emitted from a maser or other monochromatic coherent electromagnetic source by impressing a time varying field requiring relatively low power.

EXAMPLE 1

As an example of one form of the present invention, the following specific example is given. A ruby laser is used as source 10 of FIG. 1. The laser material used is an aluminum oxide crystal doped with .05% chromium. Such a laser has an output at 6943 A. Lasers of this type, being well known, will not be further described herein. Either a pulsed or continuously pumped system may be used. Absorber 12, the Q-spoiler, is formed by a ruby rod member with the C-axis of the rod parallel to the C-axis of the laser rod. The composition of the ruby of the absorber of the above example is substantially identical to that of the ruby of the laser. Spacer rod 11 is formed by a sapphire crystal of undoped aluminum oxide. The diameter of the spacer rod and the absorber are substantially equal to the diameter of the laser source. Anti-reflection coatings are placed on the exterior end of the laser and absorber sections. Multilayer dielectric reflecting coatings are used on reflecting surfaces 13 and 16. The source and absorber may be maintained at low temperatures, although such temperatures are not required for operation.

Since ruby possesses a relatively strong Zeeman effect, a magnetic field is used for Q-switching. A magnetic field is applied in a conventional manner. A coil is activated to produce a magnetic field parallel to the C-axis of the absorption ruby. A DC bias magnet may also be used to maintain an average value of the magnetic field different from zero.

Referring now to FIG. 4, line 27 is a plot of normalized absorption coefficient ($a/a_0$) as a function of flux density (B) in kilogauss. This curve applies only to ruby. The normalizing coefficient ($a_0$) used was the absorption coefficient for the $\alpha$ component at the center of the $R_1$ ruby line. The height of the normalized absorption curve at zero field is approximately 2.1. Curve 27 represents the absorption at the center of the $R_1$ line for various values of applied field. In order to utilize the minimum power in changing the transparency of the Q-spoiler, curve 28 showing the incremental change in normalized coefficient with a change in applied field was plotted. From the curves 27 and 28 it can easily be seen that the greatest change in absorption coefficient for a small change in applied field may be obtained when a DC bias field of approximately 2 kilogauss is applied and a small oscillatory field superimposed on the DC field. Such oscillatory changes in the field can switch the laser with very small power consumption.

While the above discussion has been limited to the Zeeman effect, the Stark effect may also be used in a similar manner. When a strong electric field is applied across absorber 12 a *shift* in the absorption spectrum also takes place. Very high electric fields are necessary in the case of a ruby absorber to create commercially useful shifts in transmitted intensity. With some materials other than ruby, the Stark effect will prove more useful than the Zeeman effect in practicing the present invention. Choice of the absorber material is restricted by two considerations. First, the absorber material must have a wave length within its absorption spectrum which is essentially the same as the source spectrum. Second, the absorption material must possess either Zeeman or Stark effects so that the absorption line may be shifted to vary the absorption or, conversely, the transmission of the absorber.

I claim:

1. Apparatus for producing high peak power pulses of monochromatic coherent electromagnetic energy comprising:

first and second reflective surfaces positioned to form a cavity between said surfaces;

a source of monochromatic coherent electromagnetic energy positioned between said reflective surfaces;

absorbing means, for controllably absorbing electromagnetic energy at the emission frequency of said source in response to a varying field, positioned between one of said reflective surfaces and said source; and means for applying a varying field to said absorbing means.

2. Apparatus as defined in claim 1 wherein said field is a magnetic field.

3. Apparatus as defined in claim 1 wherein said field is an electric field.

4. Apparatus for producing high peak power pulses of maser energy comprising:

first and second reflective surfaces positioned to form a cavity between said surfaces;

a maser region means, having a characteristic emission frequency, positioned between said reflective surfaces;

an absorber region means, having varying absorption frequencies under the influence of an applied field, positioned between one of said reflective surfaces and said maser region, said absorption frequencies including the characteristic emission frequency of said maser region;

optical pumping means positioned to pump said maser region; and varying field producing means positioned to create a varying field in said absorber region.

5. Apparatus as defined in claim 4 wherein said maser region and said absorber region are ruby regions.

6. Apparatus as defined in claim 5 wherein said field is a magnetic field.

References Cited

UNITED STATES PATENTS 3,281,713 10/1966 Soules.
3,295,911 1/1967 Ashkin et al.

RONALD L. WIBERT, Primary Examiner

E. S. BAUER, Assistant Examiner

U.S. Cl. X.R.

350—160; 356—4